Aug. 24, 1926.

C. C. RAMSAY 1,597,288

AUTOMOBILE HEADLIGHT

Filed Sept. 19, 1925    2 Sheets-Sheet 1

INVENTOR
Colin C. Ramsay.
BY
ATTORNEYS

Aug. 24, 1926.

C. C. RAMSAY 1,597,288

AUTOMOBILE HEADLIGHT

Filed Sept. 19, 1925   2 Sheets-Sheet 2

INVENTOR
Colin C. Ramsay.

BY
ATTORNEYS

Patented Aug. 24, 1926.

1,597,288

UNITED STATES PATENT OFFICE.

COLIN C. RAMSAY, OF NEW WESTMINSTER, BRITISH COLUMBIA, CANADA.

AUTOMOBILE HEADLIGHT.

Application filed September 19, 1925. Serial No. 57,376.

This invention relates to a directive headlight for a road vehicle and is of that class wherein the reflector with its light bulb is movable independently of the casing and its lens within which the reflector is mounted.

The reflector is designed to have two definite movements, one in which the light is directed downward on the roadway immediately in front of the vehicle, as when it is approaching another on the road, and the other a lateral movement of either lamp outward to the roadside.

Both movements are operated from the instrument board of the vehicle, the depressive movement acting on both lamps simultaneously, and the lateral movement being independent for each lamp, so that while one is directed forward in the path of the vehicle, the other may be turned outward to illuminate the curb or roadside.

The chief novelty of the device resides in the particular manner of supporting the reflector within four light spring wires curved to the radius of the reflector rim, and forming thereby a skeleton spherical bearing permitting movement of the reflector in any direction within the range of its supports.

There are other incidental features to which attention will be drawn in the following specification, reference being made to the drawings by which it is accompanied, in which.

Figure 3:
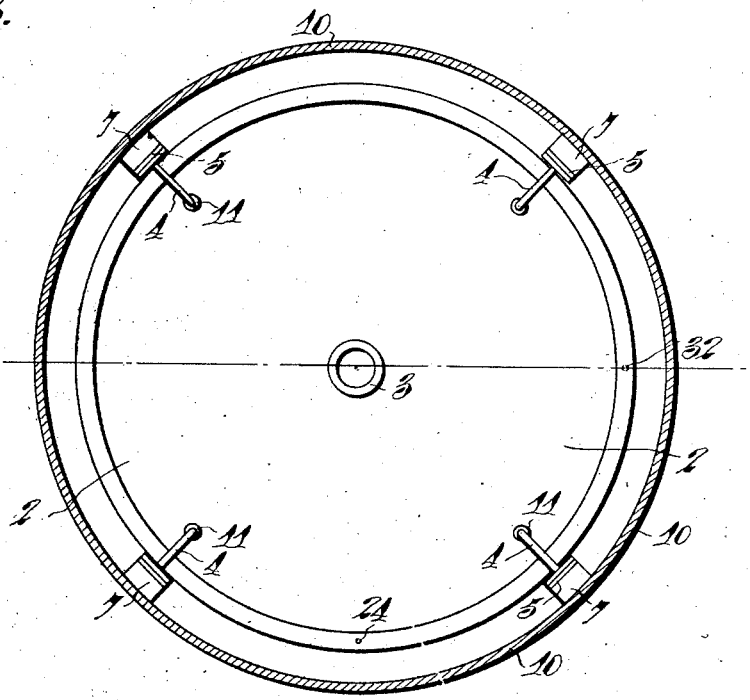
Fig. 3 is a detail side elevation of one of the reflector supporting guide wires.

The reflector 2 is supported on its rim within four equally spaced light spring wires 4, see Fig. 3, which are curved to the circle of the rim of the reflector and are secured to members 5 forwardly projecting from the corners of a square frame 6. Each supporting wire 4 is provided with a check 11 at its forward end and a similar check 12 on its after end.

The reflector may thus be moved in any direction on the supporting wires 4 within the limits of the checks 11 and 12.

The forward ends of the members 5 are outwardly turned, as at 7, to fit the inside of the cylindrical casing 10 of the headlight, and the after ends rearwardly project a short distance beyond the square frame 6 to which they are secured, and to each of these rearwardly projecting ends is secured a short flat spring 8. By these springs 8 the after end of the frame 6 is removably supported within the casing 10.

Figure 1:
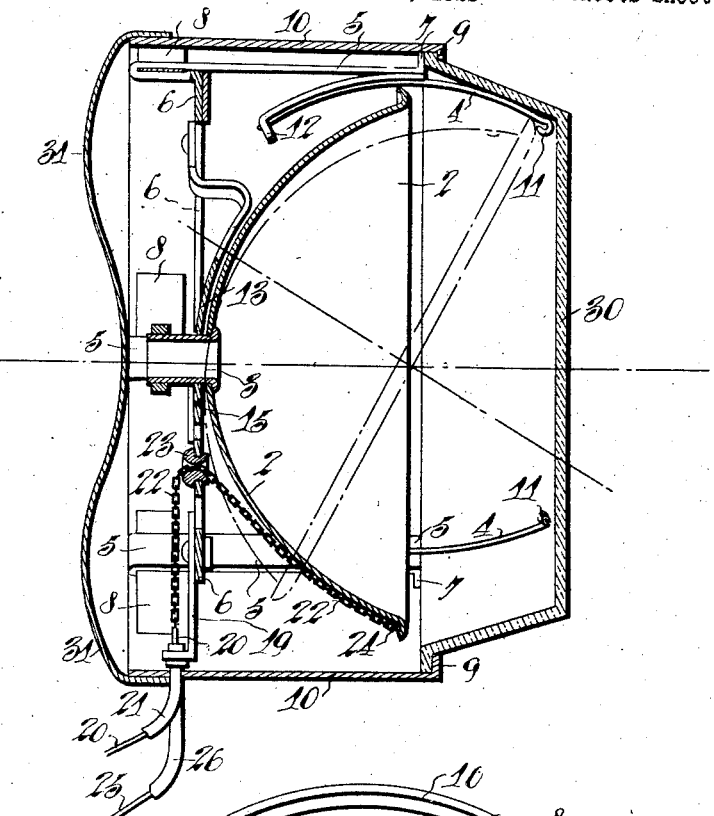
Fig. 1 is a vertical section of the lamp on the medial line.
Figure 4:
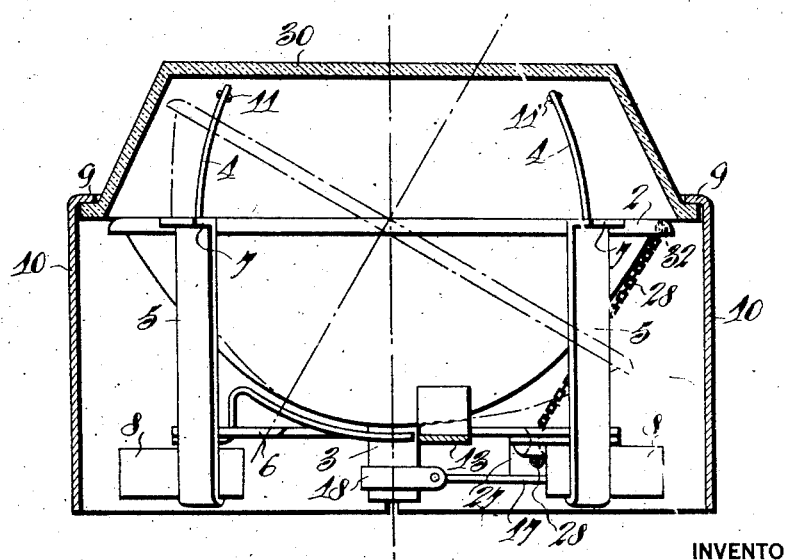
Fig. 4 is a plan of the reflector and its mounting within a section of the casing.

The forward edge of the cylindrical casing 10 is inwardly turned as at 9 to retain within it a lens or glass 30, the flat face of which is projected beyond the edge of the rim a sufficient distance to allow for the reflector 2 being angled within it as shown by the dot and dash lines in Figs. 1 and 4.

This glass 30 is introduced from the open after end of the casing 6 and is held against the glass by the outwardly turned ends 7 of the members 5 of the supporting frame. The open after end is closable with the usual cap or cover 31.

An upright member 13 is adjustably secured in lengthwise slots 14 to the upper and lower members of the frame 6 and a similar member 15 is adjustably secured in a slot 14 to project horizontally from one of the side members of the frame.

The inner edges of these members 13 and 15 engage the adjacent sides of the lamp holding socket 3 of the reflector, and while 13 prevents the axis of the reflector being turned inward, it also constitutes a guide directing the axis of the reflector downward on the road.

Similarly the member 15 prevents the axis of the reflector being turned upward beyond the limit to which it is adjusted and constitutes a guide directing it laterally outward to the side of the road.

The socket 3 is normally held in the central position against the edges of 13 and 15 by a light flat spring 16 secured to one of the members 5 at a corner of the square frame 6, the free end of which spring is connected by a wire link 17 to a strap 18 encircling the lamp receiving socket 3.

Figure 2:
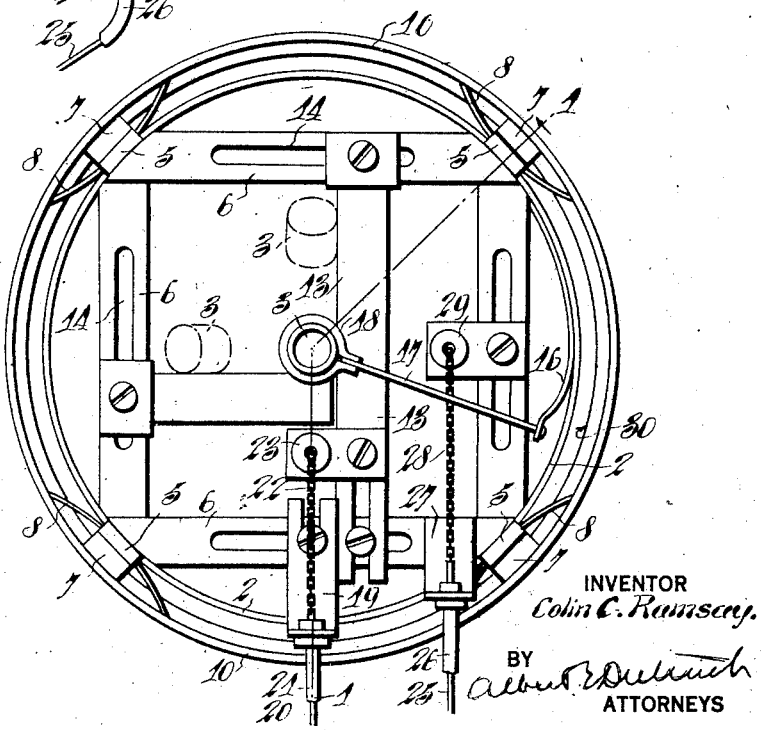
Fig. 2 is a rear view of the reflector supporting frame within the casing which is in section.

The reflector 2 is tilted downward to direct the light on the road immediately adjacent the vehicle, as when approaching another vehicle, by a Bowden wire 20 from a handle on the instrument board of the vehicle, the enclosing tube 21 of which wire is secured to a member 19 downwardly projecting from the square frame 6 so as to be removable with it from the lamp, and within the frame 6 the wire 20 is connected by a light chain 22 through a guide bushing 23 to the lower side of the reflector 2 at 24, see Figs. 1 and 2.

Similarly, the reflector 2 is directed outward to the side of the road by a Bowden wire 25 which passes through its tube 26 from the instrument board, which tube is secured to a member 27 downwardly projecting from the square frame 6 and the wire 25 is connected by a light chain 28 through a guide bushing 29 to the outer edge of the reflector at 32, see Figs. 2 and 4.

As the dipping or deflecting of both lamps of a vehicle require to be simultaneous, the two dipping wires 20 are connected to one operative wire from the instrument board, but as the wires 25 which operate the lateral movement of the reflectors require to be separately moved each is connected to a separate operating means on the right and left of the dipping wire.

This means for supporting the reflector of a headlight by its rim in a manner that its axis may be angularly directed where required within a limited range is believed to be novel, and has advantages in the simplicity and cheapness of its construction; as also is the manner of maintaining the normal position of the reflector with one spring and of limiting and adjusting its movements to what is required.

Having now particularly described my invention, I hereby declare that what I claim as new and desire to be protected in by Letters Patent, is:

1. In a directive headlight, the combination with a cylindrical casing, of an open frame supported within the casing, said frame having a series of light guide members projecting forward from it, each guide member curved to the circle of the rim of the reflector, a reflector supported on its rim within the guide members and means to adjust the reflector within the guide members.

2. A directive headlight, comprising a casing, an open frame supported within the casing, a reflector supported on its rim within the open frame in guideways curved to the curvature of the rim, means for directing the axis of the reflector downward from its normal straight ahead position, means for directing it angularly outward from its normal straight ahead position, and means adjustably secured to the open frame for retaining the movement of the reflector within the desired limits.

In testimony whereof I affix my signature.

COLIN C. RAMSAY.